United States Patent
Sahasrabudhe et al.

(10) Patent No.: US 11,080,190 B2
(45) Date of Patent: Aug. 3, 2021

(54) DETECTING AND CORRECTING CACHE MEMORY LEAKS

(71) Applicant: EMC IP Holding Company LLC, Hopkinton, MA (US)

(72) Inventors: Kaustubh Sahasrabudhe, Westborough, MA (US); Steven Ivester, Worcester, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 96 days.

(21) Appl. No.: 16/507,442

(22) Filed: Jul. 10, 2019

(65) Prior Publication Data

US 2021/0011850 A1 Jan. 14, 2021

(51) Int. Cl.
*G06F 12/08* (2016.01)
*G06F 12/0815* (2016.01)
*G06F 12/0891* (2016.01)
*G06F 9/54* (2006.01)
*G06F 9/38* (2018.01)
*G06F 12/0871* (2016.01)

(52) U.S. Cl.
CPC ........ *G06F 12/0815* (2013.01); *G06F 9/3861* (2013.01); *G06F 9/542* (2013.01); *G06F 12/0871* (2013.01); *G06F 12/0891* (2013.01)

(58) Field of Classification Search
None
See application file for complete search history.

(56) References Cited

U.S. PATENT DOCUMENTS

| | | | | |
|---|---|---|---|---|
| 6,636,906 B1 * | 10/2003 | Sharma | ............... | G06F 12/0835 710/22 |
| 7,552,282 B1 * | 6/2009 | Bermingham | ...... | G06F 12/0802 711/118 |
| 8,082,397 B1 * | 12/2011 | Ezra | ...................... | G06F 12/084 711/130 |
| 2012/0084514 A1 * | 4/2012 | Blinick | ............... | G06F 12/0804 711/136 |

\* cited by examiner

*Primary Examiner* — Kaushikkumar M Patel
(74) *Attorney, Agent, or Firm* — Krishnendu Gupta; Nikhil Patel

(57) ABSTRACT

Embodiments of the present disclosure relate to an apparatus comprising a memory and at least one processor. The at least one processor is configured to monitor one or more processing threads of a storage device. Each of the one or more processing threads includes two or more cache states. The at least one processor also updates one or more data structures to indicate a subject cache state of each of the one or more processing threads and detect an event that disrupts at least one of the one or more processing threads. Further, the processor determines a cache state of the at least one of the one or more processing threads contemporaneous to the disruption event using the one or more data structures and performs a recovery process for the disrupted at least one of the one or more processing threads.

18 Claims, 5 Drawing Sheets

DETECTING AND CORRECTING CACHE MEMORY LEAKS

BACKGROUND

Memory management is a form of resource management applied to computer memory. Memory management can be used to provide ways to dynamically allocate portions of memory to programs at their request, and free it for reuse when no longer needed. Enabling more efficient memory management can be important to computer systems where more than a single process might be underway at any time.

SUMMARY

One or more aspects of the present disclosure relates monitoring one or more processing threads of a storage device. Each of the one or more processing threads includes two or more cache states. One or more data structures can also be updated to indicate a subject cache state of each of the one or more processing threads and an event that disrupts at least one of the one or more processing threads can be detected. Further, a cache state of the at least one of the one or more processing threads contemporaneous to the disruption event can be determined using the one or more data structures and a recovery process for the disrupted at least one of the one or more processing threads can be performed.

In embodiments, a state machine unique to each of the one or more processing threads can be generated. Each state machine can be configured to update the one or more data structures to indicate the subject cache state of each of the one or more processing threads. Additionally, each of the one or more data structures can correspond to a respective one of the one or more processing threads.

In embodiments, a recovery state machine for each of the one or more processing threads can be generated. Each state of the recovery state machine can indicate a recovery action for a respective one of the one or more processing threads.

In embodiments, the recovery state machine can be provided with the cache state contemporaneous to the disruption event. The recovery state machine can be configured to perform the recovery action corresponding to the cache state of the one or more processing threads contemporaneous to the disruption event.

In embodiments, a size of the one or more data structures can be configured to scale based on a number of the one or more processing threads.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

In a multi-controller storage system (e.g., storage system 12 of FIG. 1) using a distributed cache memory layout of a global memory (e.g., memory 25*b* of FIG. 1), the allocation and de-allocation of cache slots of the global memory by an input/output (I/O) thread is not an atomic operation as far as CPU instructions are concerned. For example, it takes several instructions and more than one direct memory access (DMA) to successfully allocate a cache slot of the global memory. Thus, if a disruptive system event (e.g., an unexpected power-loss or software/hardware exception) interrupts a cache allocation process, the global memory can have partially allocated slots due to incomplete updates to cache metadata and/or track ID table metadata of the cache slots. Additionally, such disruptive events can cause a processing thread to fail to release previously allocated slots resulting in orphaned slots. Such cache slots can remain in an unusable state until a cache scrubber or a sanity check routine identifies unusable cache slots. However, after identifying an unusable cache slot, some processes simply quarantine (e.g., fence) those slots to avoid further damage to any data and metadata related to those cache slots. Partial slot allocations can often escalate into a data unavailable/data loss (DUDL) event and generate dial-home errors requiring a high-risk and high-cost manual recovery process by an engineer to perform bit-specific memory correction.

Embodiments of the present disclosure relate to methods, systems, and apparatus comprising a memory and at least one processor. The at least one processor is configured to monitor one or more processing threads of a storage device. Each of the one or more processing threads includes two or more cache states. The at least one processor also updates one or more data structures to indicate a subject cache state of each of the one or more processing threads and detect an event that disrupts at least one of the one or more processing threads. Further, the processor determines a cache state of the at least one of the one or more processing threads contemporaneous to the disruption event using the one or more data structures and performs a recovery process for the disrupted at least one of the one or more processing threads.

Additional embodiments use a shared local table, a single bit in a cache slot metadata and a state-machine to track each step of cache usage as an IO thread progresses. If a disruptive event occurs or if the thread accidentally leaks cache slots due to a software bug in the logic of the cache sub-system, the techniques described herein can dynamically detect that and take any needed corrective action.

Figure 1:
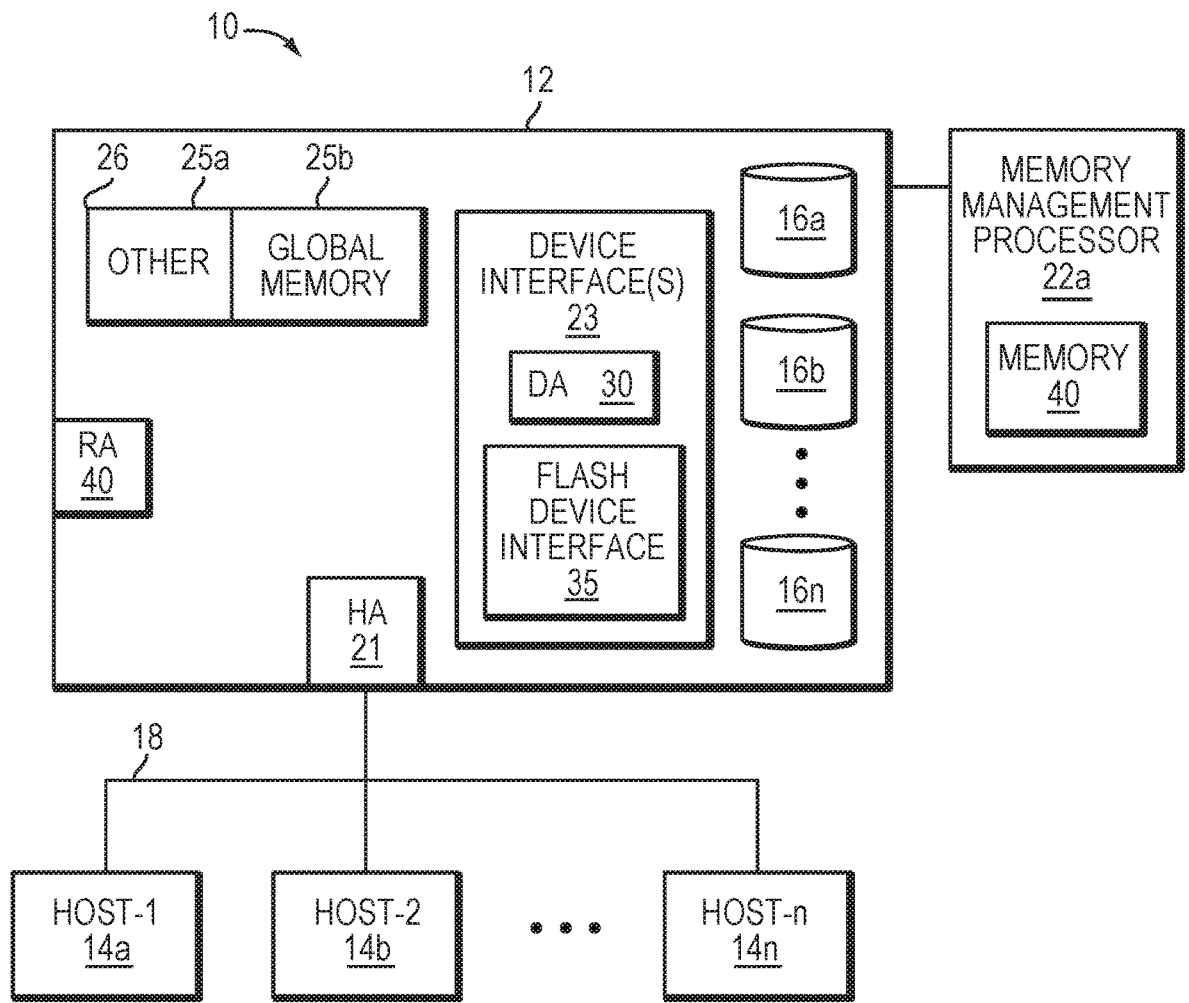
FIG. 1 is a block diagram of an example a storage system in accordance with example embodiments disclosed herein.

Referring to FIG. 1, shown is an example of an embodiment of a system 10 that may be used in connection with performing the techniques described herein. The system 10 includes a data storage system 12 connected to host systems 14*a*-14*n* through communication medium 18. In embodiments, the hosts 14*a*-14*n* can access the data storage system 12, for example, to perform input/output (I/O) operations or data requests. The communication medium 18 can be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host 14a-14n can access and communicate with the data storage system 12. The hosts 14a-14n can also communicate with other components included in the system 10 via the communication medium 18.

Each of the hosts 14a-14n and the data storage system 12 can be connected to the communication medium 18 by any one of a variety of connections as may be provided and supported in accordance with the type of communication medium 18. The processors included in the hosts 14a-14n may be any one of a variety of proprietary or commercially available single or multi-processor system, such as an Intel-based processor, or other type of commercially available processor able to support traffic in accordance with each embodiment and application.

It should be noted that the examples of the hardware and software that may be included in the data storage system 12 are described herein in more detail and can vary with each embodiment. Each of the hosts 14a-14n and data storage system 12 can all be located at the same physical site or can be located in different physical locations. Examples of the communication medium 18 that can be used to provide the different types of connections between the host computer systems and the data storage system of the system 10 can use a variety of different communication protocols such as SCSI, Fibre Channel, iSCSI, and the like. Some or all the connections by which the hosts 14a-14n and data storage system 12 can be connected to the communication medium may pass through other communication devices, such switching equipment that may exist such as a phone line, a repeater, a multiplexer or even a satellite.

Each of the hosts 14a-14n can perform different types of data operations in accordance with different types of tasks. In embodiments, any one of the hosts 14a-14n may issue a data request to the data storage system 12 to perform a data operation. For example, an application executing on one of the hosts 14a-14n can perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by DELL Technologies of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. The techniques described herein can be used in an embodiment in which one or more of the devices 16a-16n are flash drives or devices. More generally, the techniques herein may also be used with any type of SSD although following paragraphs can refer to a particular type such as a flash device or flash memory device.

The data storage array 12 may also include different types of adapters or directors, such as an HA 21 (host adapter), RA 40 (remote adapter), and/or device interface 23. Each of the adapters HA 21, RA 40 may be implemented using hardware including a processor with local memory with code stored thereon for execution in connection with performing different operations. The HA 21 may be used to manage communications and data operations between one or more host systems 14a-14n and the global memory (GM) 25b. In an embodiment, the HA 21 may be a Fibre Channel Adapter (FA) or another adapter which facilitates host communication. The HA 21 may be characterized as a front-end component of the data storage system 12 which receives a request from one or more of the hosts 14a-14n. The data storage array 12 can include one or more RAs (e.g., RA 40) that may be used, for example, to facilitate communications between data storage arrays. The data storage array 12 may also include one or more device interfaces 23 for facilitating data transfers to/from the data storage devices 16a-16n. The data storage interfaces 23 may include device interface modules, for example, one or more disk adapters (DAs) 30 (e.g., disk controllers), flash drive interface 35, and the like. The DA 30 can be characterized as a back-end component of the data storage system 12 which interfaces with the physical data storage devices 16a-n.

One or more internal logical communication paths may exist between the device interfaces 23, the RAs 40, the HAs 21, and the memory 26. An embodiment, for example, may use one or more internal busses and/or communication modules. For example, the global memory 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The data storage system as described in this embodiment, or a device thereof, such as a disk or aspects of a flash device, should not be construed as a limitation. Other types of commercially available data storage systems, as well as processors and hardware controlling access to these devices, may also be included in an embodiment.

Host systems 14a-14n provide data and access control information through channels to the storage systems 12, and the storage systems 12 may also provide data to the host systems 14a-14n also through the channels. The host systems 14a-14n do not address the drives or devices 16a-16n of the storage systems directly, but rather access to data can be provided to one or more host systems 14a-n from what the host systems view as a plurality of logical devices or logical volumes (LVs). The LVs may or may not correspond to the actual physical devices or drives 16a-16n. For example, one or more LVs may reside on a single physical drive or multiple drives. Data in a single data storage system, such as a single data storage array 12, may be accessed by multiple hosts allowing the hosts to share the data residing therein. The HA 21 may be used in connection with communications between a data storage array 12 and one or more of the host systems 14a-n. The RA 40 may be used in facilitating communications between two data storage arrays. The DA 30 may be one type of device interface used in connection with facilitating data transfers to/from the associated disk drive(s) 16a-n and LV(s) residing thereon. A flash device interface 35 may be another type of device interface used in connection with facilitating data transfers to/from the associated flash devices and LV(s) residing thereon. It should be noted that an embodiment may use the same or a different device interface for one or more different types of devices than as described herein.

The device interface, such as a DA 30, performs I/O operations on a drive 16a-16n. In the following description, data residing on an LV may be accessed by the device interface following a data request in connection with I/O operations that other directors originate. Data may be accessed by LV in which a single device interface manages data requests in connection with the different one or more LVs that may reside on a drive 16a-16n. For example, a device interface may be a DA 30 that accomplishes the foregoing by creating job records for the different LVs associated with a device. These different job records may be associated with the different LVs in a data structure stored and managed by each device interface.

Also shown in FIG. 1 is a memory management processor 22a that may be used to manage and monitor the system 12. In one embodiment, the memory management processor 22a may be used in monitoring processing threads, for example, regarding I/O processing threads in connection with data storage system 12. Accordingly, the memory management processor 22a can, for example, take corrective actions in connection with a disruptive event during cache allocation and/or deallocation. Additional detail regarding the memory management processor 22a is described in following paragraphs.

It should be noted that a memory management processor 22a may exist external to the data storage system 12 and may communicate with the data storage system 12 using any one of a variety of communication connections. In one embodiment, the memory management processor 22a may communicate with the data storage system 12 through three different connections, a serial port, a parallel port and using a network interface card, for example, with an Ethernet connection. Using the Ethernet connection, for example, a memory management processor may communicate directly with DA 30 and HA 21 within the data storage system 12.

Figure 2:
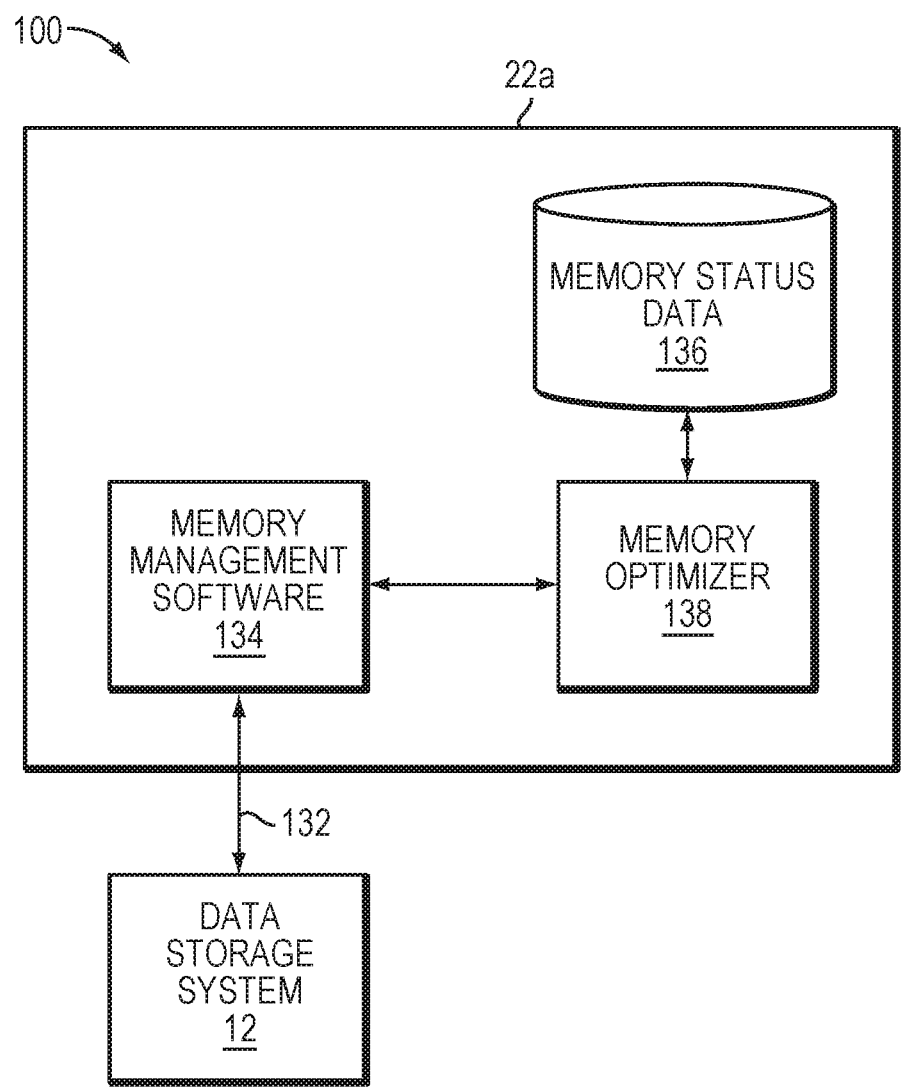
FIG. 2 is a block diagram of an example memory management processor in accordance with example embodiments disclosed herein.

Referring to FIG. 2, a memory management processor 22a can include elements 100 (e.g., software and hardware elements). It should be noted that the memory management processor 22a may be any one of a variety of commercially available processors, such as an Intel-based processor, and the like. Although what is described herein shows details of software that may reside in the memory management processor 22a, all or portions of the illustrated components may also reside elsewhere such as, for example, on HA 21 or any of the host systems 14a-14n of FIG. 1. In other embodiments, the memory management processor 22a can be a parallel processor such as a graphical processing unit (GPU).

Included in the memory management processor 22a is memory management software 134 which monitors one or more processing threads (e.g., input/output (I/O) operations such as read/write operations) of the data storage system 12 through the connection 132. The memory management software 134 gathers and stores memory status data 136 in, e.g., memory 40 of FIG. 1 during a processing thread. Memory status data 1365 can include bit-specific states derived from any globally stored metadata.

In embodiments, the memory status data can relate to a status of one more cache slots in a global memory (e.g., global memory 25b of FIG. 1). For example, a write processing thread (e.g., processing thread 405 of FIG. 4) can include one or more processing steps and each step can adjust a state of a cache slot.

As discussed herein, an event can disrupt a processing thread thereby leaving a cache slot allocated to the processing thread in an unusable condition. In some non-limiting examples, an event can include an unexpected power-loss, software exception, or hardware failure or exception. In embodiments, a disruptive event can interrupt a cache allocation process resulting in partially allocated slots due to incomplete updates to cache metadata and/or a track ID table metadata. In other embodiments, a software bug can cause a processing thread to fail to give up cache resources it had previously allocated resulting in orphaned slots.

Accordingly, the memory management software 134 is configured to detect an event that disrupts at least one of the one or more processing threads. For example, each of the one or more processing threads can be configured as a unique state machine (e.g., state machine 305 of FIG. 3) having one or more nodes (i.e., states or steps of a processing thread). Each node can correspond to a respective step of the one or more processing threads. Once a node completes its respective process, the node can issue a notification to the memory management processor 22a, which updates a data structure to indicate a state of a cache slot subject to the processing thread. Thus, the memory management software 135 can determine that a disruptive event has occurred. For example, the memory management software 135 can be coded to expect notifications from each node at pre-determined time intervals. Accordingly, if the memory management software 135 has not received a notification from a node from which it expects to receive a notification after a time interval, the memory management software 135 determines that a disruptive event has occurred.

In response to detecting a disruptive event, the memory management software 134 can notify a memory optimizer 138 of the event and provide the memory optimizer 138 with a cache state of a cache slot that was the subject of the interrupted processing thread. The memory optimizer 138 can receive the notice along with the cache state and perform a recover process for the interrupted processing thread. In embodiments, the memory optimizer 138 can generate and store a recovery data structure (e.g., recovery state machine or recovery look-up table). In one embodiment, using the cache state information, the memory optimizer 138 uses the recovery data structure to determine a recovery action to perform.

Figure 3:
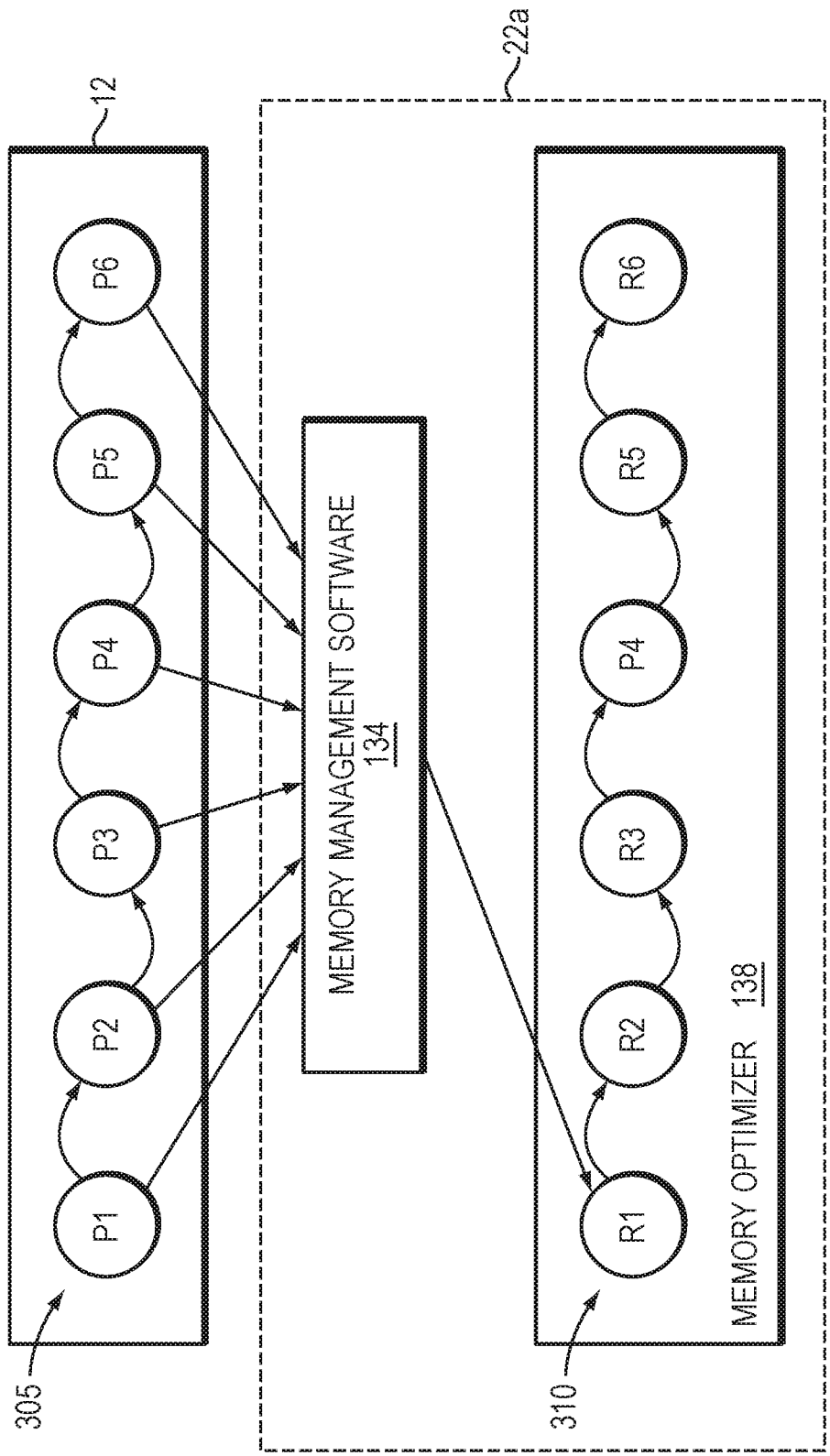
FIG. 3 is a block diagram of a state machine configured to detect and correct cache memory leaks of a global memory in accordance with example embodiments disclosed herein.

Referring to FIG. 3, a data storage system 12 can receive one or more I/O operations (e.g., a read/write operation). Each I/O operation can require deallocation and/or allocation of cache slots in global memory (e.g., global memory 25b of FIG. 1). The deallocation and/or allocation can be performed by pre-coded processing threads (e.g., computing instructions). The processing threads can be represented as a state machine (e.g., state machine 305). As illustrated, the state machine 305 can include processing nodes P1-P6 for completing an I/O operation. Each node P1-P6 can correspond to a respective step of the one or more processing threads. Once a node completes its respective process, the node can issue a notification to the memory management processor 22a, which monitors processing threads and updates one or more date structures to indicate cache slot states subject to each processing thread as described with respect to FIG. 2.

As discussed with respect to FIG. 2, a memory management software 134 detects events that can disrupt a processing thread. The memory management software 134 then notifies a memory optimizer 138 of the event and provides the memory optimizer with a cache state of a cache slot that was the subject of the interrupted processing thread.

The memory optimizer 138 can include recovery state machines such as recovery state machine 310 that can ingest the cache state machine and determine a recovery action to perform. For example, the recovery state machine 310 can include recovery nodes R1-R6 that each include instructions for performing a particular recovery action based on a cache state. Thus, each recovery node R1-R6 can receive cache state information as input and determine if it should take a recovery action. If a recovery node determines it does not need to perform a recovery action, the recovery node can pass the cache state information to a next recovery node in the recovery state machine 310 until a recovery node is triggered to perform a recovery action.

Figure 4:
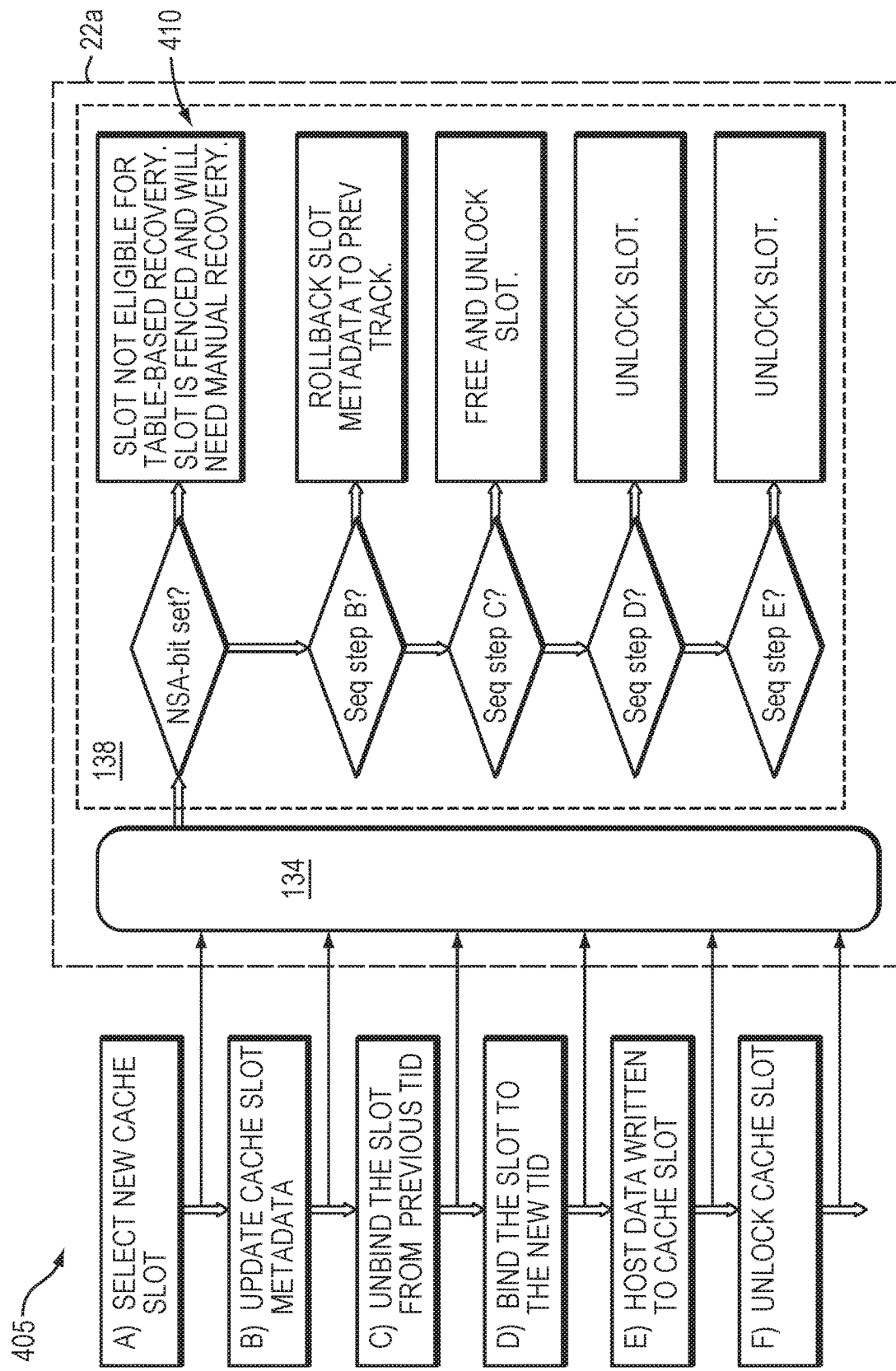
FIG. 4 is a sequence diagram for detecting and correcting cache memory leaks of a global memory in accordance with example embodiments disclosed herein.

FIG. 4 illustrates is a sequence diagram for performing a write operation in accordance with example embodiments of the present disclosure. The illustrated write operation is a particular use case scenario in which techniques of the present disclosure can be applied. Those skilled in the art understand that the techniques described herein can be applied to any other I/O operations.

Referring to FIG. 4, a write processing thread 405 is represented as a write state machine having write nodes A-F. Each of the write nodes A-F is configured to perform a particular memory allocation/deallocation action to complete a write request. Each of the write nodes A-F is configured to notify a memory management processor 22a upon completion of its respective processing action. The memory management processor 22a includes memory management software 134 that is configured to monitor the processing thread and update a data structure to indicate a cache slot state that is the subject of the processing thread. In response to detecting a disruption event, the memory management software 134 notifies a memory optimizer 138 of the event and provides the memory optimizer 138 with a cache state of a cache slot that was the subject of the interrupted processing thread. In embodiments, the memory optimizer 138 can generate and store a recovery data structure 410 (e.g., a recovery state machine or recovery look-up table). In this example, the recovery data structure is represented as a recovery state machine having recovery nodes A-E. Each of the recovery nodes A-E, as illustrated, include instructions for performing a particular recovery action based on a cache state. Thus, each recovery node A-E can receive cache state information as input and determine if it should take a recovery action.

Figure 5:
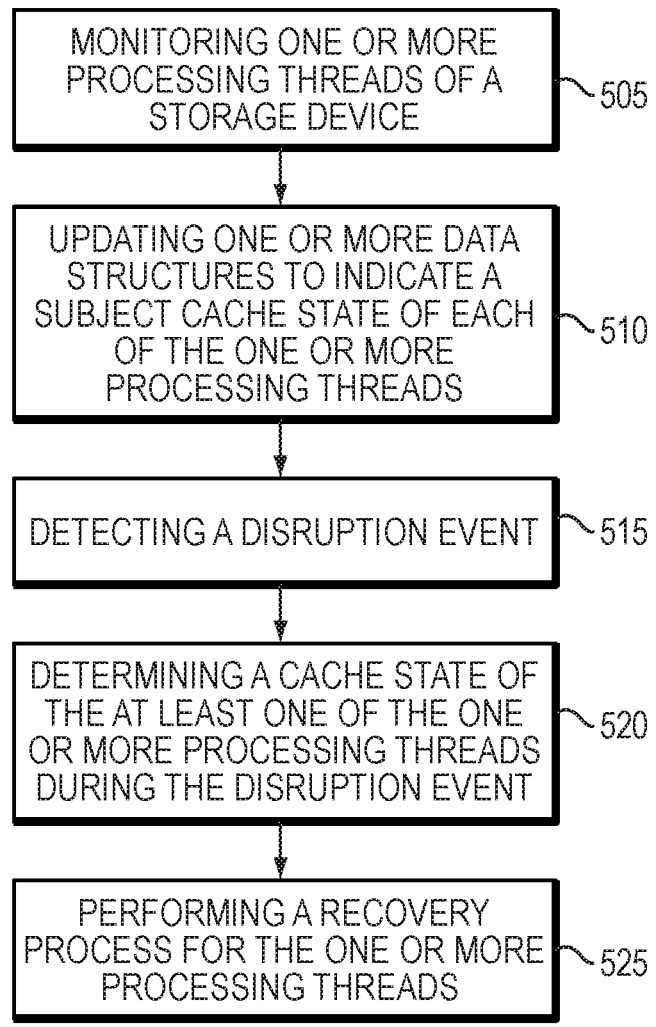
FIG. 5 is a flow diagram of an example method for detecting and correcting cache memory leaks of a global memory in accordance with example embodiments disclosed herein.

FIG. 5 illustrates a method and/or flow diagram in accordance with this disclosure. For simplicity of explanation, the method is depicted and described as a series of acts. However, acts in accordance with this disclosure can occur in various orders and/or concurrently, and with other acts not presented and described herein. Furthermore, not all illustrated acts may be required to implement the method in accordance with the disclosed subject matter.

Referring to FIG. 5, in embodiments, a method 500 can be executed by a memory management processor (e.g., the memory management processor 22a of FIG. 1). The method 500, at 505, can include monitoring one or more processing threads of a storage device (e.g., the storage device 12 of FIG. 1). In embodiments, the one or more processing threads can correspond to cache management techniques in response to receiving one or more I/O operations (e.g., read or write). The cache management techniques can include changing at least two states of a cache slot of global memory (e.g., global memory 25b of FIG. 1). At 510, the method 500 can include updating a data structure to indicate a cache state associated with each of the one or more processing threads. The method 500, at 515, can further include detecting a disruption event. The disruption event can interrupt the one or more processing threads from changing a state of the cache slot. Accordingly, the method 500, at 520, can include determining a cache state of the at least one of the one or more processing threads contemporaneous to the disruption event using the one or more data structures. At 525, the method 500 can include performing a recovery process for the disrupted at least one of the one or more processing threads.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the concepts described herein by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random-access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD- ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the concepts described herein may be embodied in other specific forms without departing from the spirit or essential characteristics thereof. The foregoing embodiments are therefore to be considered in all respects illustrative rather than limiting of the concepts described herein. Scope of the concepts is thus indicated by the appended claims, rather than by the foregoing description, and all changes that come within the meaning and range of equivalency of the claims are therefore intended to be embraced therein.

What is claimed is:

1. An apparatus comprising a memory and at least one processor configured to:
    monitor one or more processing threads of a storage device, wherein each of the one or more processing threads includes at least one processing step that adjusts a state of at least one cache slot;
    update one or more data structures to indicate a processing status of each of the one or more processing threads;
    update the one or more data structures to indicate the state of the at least one cache slot in response to an execution of the at least one processing step;
    detect an event that disrupts at least one of the one or more processing threads;
    in response to detecting the event, identify the states of the one or more processing threads and the at least one cache slot using the at least one or more data structures; and
    perform a recovery process for the at least one cache slot by selecting a recovery node including instructions for recovering the cache slot based in the identified states.

2. The apparatus of claim 1 further configured to generate a state machine unique to each of the one or more processing threads.

3. The apparatus of claim 2, wherein each state machine is configured to update the one or more data structures to indicate the subject cache state of each of the one or more processing threads.

4. The apparatus of claim 1, wherein each of the one or more data structures corresponds to a respective one of the one or more processing threads.

5. The apparatus of claim 1 further configured to generate a recovery state machine for each of the one or more processing threads, wherein each state of the recovery state machine indicates a recovery action for a respective one of the one or more processing threads.

6. The apparatus of claim 5 further configured to provide the recovery state machine with the cache state contemporaneous to the disruption event.

7. The apparatus of claim 6 further configured to configure the recovery state machine to perform the recovery action corresponding to the cache state of the one or more processing threads contemporaneous to the disruption event.

8. The apparatus of claim 1 further configured to scale a size of the one or more data structures based on a number of the one or more processing threads.

9. The apparatus of claim 1 wherein a disruption event includes one or more of the following: unexpected power-loss, software exception, and hardware failure or exception.

10. A method comprising:
  monitoring one or more processing threads of a storage device, wherein each of the one or more processing threads includes at least one processing step that adjusts a state of at least one cache slot;
  updating one or more data structures to indicate a processing status of each of the one or more processing threads;
  updating the one or more data structures to indicate the state of the at least one cache slot in response to an execution of the at least one processing step;
  detecting an event that disrupts at least one of the one or more processing threads;
  in response to detecting the event, identifying the states of the one or more processing threads and the at least one cache slot using the at least one or more data structures; and
  performing a recovery process for the at least one cache slot by selecting a recovery node including instructions for recovering the cache slot based in the identified states.

11. The method of claim 10 further comprising generating a state machine unique to each of the one or more processing threads.

12. The method of claim 11 further comprising updating the one or more data structures to indicate the subject cache state of each of the one or more processing threads using each generated state machine.

13. The method of claim 10, wherein each of the one or more data structures corresponds to a respective one of the one or more processing threads.

14. The method of claim 10 further comprising generating a recovery state machine for each of the one or more processing threads, wherein each state of the recovery state machine indicates a recovery action for a respective one of the one or more processing threads.

15. The method of claim 14 further comprising providing the recovery state machine with the cache state contemporaneous to the disruption event.

16. The method of claim 15 further comprising performing the recovery action corresponding to the cache state of the one or more processing threads contemporaneous to the disruption event using the recovery state machine.

17. The method of claim 10 further comprising scaling a size of the one or more data structures based on a number of the one or more processing threads.

18. The method of claim 10 wherein a disruption event includes one or more of the following: unexpected power-loss, software exception, and hardware failure or exception.

* * * * *